(12) United States Patent
Pertsovich

(10) Patent No.: US 7,985,818 B2
(45) Date of Patent: Jul. 26, 2011

(54) METHOD TO SELECTIVELY REMOVE SAFROLE FROM NUTMEG OIL

(75) Inventor: Svetlana I. Pertsovich, Moscow (RU)

(73) Assignee: R.J. Reynolds Tobacco Company, Winston-Salem, NC (US)

( * ) Notice: Subject to any disclaimer, the term of this patent is extended or adjusted under 35 U.S.C. 154(b) by 479 days.

(21) Appl. No.: 12/296,468

(22) PCT Filed: Apr. 10, 2006

(86) PCT No.: PCT/RU2006/000174
§ 371 (c)(1),
(2), (4) Date: Oct. 8, 2008

(87) PCT Pub. No.: WO2007/117174
PCT Pub. Date: Oct. 18, 2007

(65) Prior Publication Data
US 2010/0239726 A1    Sep. 23, 2010

(51) Int. Cl.
    C08F 2/00    (2006.01)
(52) U.S. Cl. ........ 526/199; 526/200; 526/201; 526/215; 526/243; 526/317.1; 526/318.43; 526/323.2; 526/326; 424/728; 424/769; 514/26
(58) Field of Classification Search .................. 526/199, 526/200, 201, 215, 243, 317.1, 318.43, 323.2, 526/326; 424/728, 769; 514/26
See application file for complete search history.

(56) References Cited

U.S. PATENT DOCUMENTS

| | | | |
|---|---|---|---|
| 3,740,306 A * | 6/1973 | Kosbab et al. ............... 428/349 |
| 3,797,690 A * | 3/1974 | Taylor et al. ............... 428/35.4 |
| 5,110,833 A | 5/1992 | Mosbach |
| 5,630,978 A | 5/1997 | Domb |
| 5,821,311 A | 10/1998 | Mosbach et al. |
| 5,858,296 A | 1/1999 | Domb |
| 5,959,050 A | 9/1999 | Mosbach et al. |
| 6,127,154 A | 10/2000 | Mosbach et al. |
| 6,274,686 B1 | 8/2001 | Mosbach et al. |
| 6,489,418 B1 | 12/2002 | Mosbach |
| 6,759,488 B1 | 7/2004 | Sellergren et al. |
| 6,881,804 B1 | 4/2005 | Sellergren et al. |
| 7,087,748 B2 | 8/2006 | Mosbach et al. |
| 2004/0047930 A1 * | 3/2004 | Webbe et al. ............... 424/769 |
| 2004/0096979 A1 | 5/2004 | Petcu et al. |
| 2004/0157209 A1 | 8/2004 | Yilmaz et al. |
| 2007/0065526 A1 * | 3/2007 | Gow et al. ............... 424/728 |

FOREIGN PATENT DOCUMENTS

WO    WO 2004/067578    8/2004

OTHER PUBLICATIONS

Baggiani et al. *Analytica Chimica Acta* 2007, 591, 29-39.
Blahova et al. *J. Liq. Chrom Related Tech*. 2004 27(17), 2715-2731.
Bruggemann et al. *Analytica Chimica Acta* 2004 504, 81-88.
Ikegami et al. *Analytica Chimica Acta* 2004, 504, 131-135.
Joshi et al. *Chem. Eng. Science* 1998, 53(13), 2271-2284.
Karasova et al. *J. Sep. Sci.* 2005 28(18), 2468-2476.
Kobayashi et al. *Analytica Chemica Acta* 1998 365, 81-88.
Kugimiya et al. *Analytica Chimica Acta* 1999 395, 251-255.
Kugimiya et al. *Anal. Bioanal. Chem*. 2002 37, 305-307.
Mahony et al. *Analytica Chimica Acta* 2005, 534, 31-39.
Masquee et al. *Trends Anal. Chem*. 2001, 20(9) 477-486.
Matsui et al. *Analytica Chimica Acta* 1997, 343, 1-4.
Mosbach et al. *Scientific American* 2006, October, 86-91.
O'Mahony et al. *Biosensors Bioelectronics* 2006, 21, 1383-1392.
Oua et al. *Analytica Chimica Acta* 2004, 504, 163-166.
Piletska et al. *Analytica Chimica Acta* 2008, 607, 54-60.
Simon et al. *Analytica Chimica Acta* 2007, 591, 7-16.
Stikovsky et al. *Reactive & Func. Polymers* 2003, 54, 49-61.
Suarez-Rodriguez et al. *Analytica Chimica Acta* 2000, 405, 67-76.
Weiss et al. *Bioseparation* 2002, 10, 379-387.
Xie et al. *J. Chrom A* 2001 734(1-2), 1-11.
Ye et al. *J. Incl. Phemon. Macro. Chem*. 2001, 41, 107-113.
Yoshikawa *Bioseparation* 2002, 10, 277-286.
Zheng et al. *Analytica Chimica Acta* 2002, 452, 277-283.
International Search Report for corresponding PCT International Application No. PCT/RU2006/000174, mailed on Mar. 7, 2007.
Written Opinion of the International Searching Authority for corresponding PCT International Application No. PCT/RU2006/000174, mailed on Mar. 7, 2007.

* cited by examiner

*Primary Examiner* — Bernard Lipman
(74) *Attorney, Agent, or Firm* — Brinks Hofer Gilson & Lione

(57) ABSTRACT

Methods for removing safrole from a sample, molecular imprinted copolymers that bind safrole, and methods of making the same are provided.

20 Claims, 2 Drawing Sheets

METHOD TO SELECTIVELY REMOVE SAFROLE FROM NUTMEG OIL

FIELD OF THE INVENTION

Methods for removing safrole from a sample, molecular imprinted polymers that bind safrole, and methods of making the same are provided.

BACKGROUND

The nutmeg tree, *Myristica fragans* which belong to the family Myristicaceae, is an 8-10 meter high evergreen tree that is cultivated in India, Indonesia and Ceylon. This tree bears two separate and distinct products which can be harvested all year long: nutmeg which is the kernel of the seed, and mace which is the dried aril that surrounds the single seed within the fruit. Nutmeg is a grayish brown, ovoid seed that is a well known spice used in food. Nutmeg essential oil is produced by steam distillation of the rip and dried nutmeg. The main components of nutmeg essential oil aresabinene (14-29%), α-pinene (15-28%), β-pinene (13-18%), limonene (2-7%), myristicin (5-12%), elemicin, eugenol, isoeugenol and safrole. Safrole is also known as [5-(2-propenyl)1,3-benzodioxole].

The use of safrole in food is limited due to its associated toxicity. The US Food and Drug Administration (FDA) has prohibited the use of safrole in human food. The Council of Europe has limited the use of safrole in food and beverages to less than 1 ppm. The International Agency for the Research on Cancer (IARC) describes safrole as carcinogenic in mice and rats, and possible carcinogenic to humans. The International Fragrance Association has prohibited the use of safrole as a fragrance ingredient and limits the use of safrole to not exceed 0.01% in consumer products. Isosafrole and dihydrosafrole which differ from safrole in the position of the side chain double bond and saturation of this side chain, respectively, are treated in the same manner as safrole by the aforementioned agencies.

One method for removing safrole from nutmeg oil is distillation. U.S. published patent application 2004/0047930 recites nutmeg oil derived from Grenada nutmegs. The nutmeg oil was purified via steam distillation and the resulting nutmeg oil comprised <0.5% safrole.

Molecular imprinting is a developing technique for the preparation of synthetic polymers containing recognition sites for certain target molecules and is described in U.S. Pat. No. 5,630,978 and U.S. published patent application 2004/0157209. Molecular imprinting is achieved by co-polymerizing functional monomers and cross-linking monomers in the presence of the target molecule, which acts as a molecular template. The functional monomers arrange specifically around the molecular template, and are subsequently held in position by polymerization with a usually high degree of cross-linking. After polymerization, the molecular template is extracted from the polymer, revealing complementary binding sites that allow rebinding of the target molecule with in many cases very high specificity, comparable to that of antibodies. U.S. published patent application 2004/0096979 describes imprinted polymers for detecting phenols, but does not discuss compounds such as safrole and the like.

The aroma of nutmeg essential oil is a unique combination of various flavor materials in specific amounts. What is needed is a method of removing safrole from nutmeg essential oil and other compositions, and in particular a method that preferably removes safrole while retaining the aroma and flavor of the nutmeg essential oil.

BRIEF SUMMARY

In one embodiment, a method of preparing substantially safrole free nutmeg essential oil is provided. The method comprises providing acylamide monomer, dihydrosafrole as the template molecule, and co-polymerizing these in the presence of a crosslinking agent to form a co-polymerized composition; substantially removing dihydrosafrole from the co-polymerized composition to form a molecularly imprinted co-polymer; and contacting the molecularly imprinted co-polymer with nutmeg essential oil comprising safrole to bind the safrole to the molecularly imprinted co-polymer and form substantially safrole free nutmeg essential oil.

In another embodiment, a method for removing safrole, dihydrosafrole, or isosafrole from a sample is provided. The method comprises providing at least one monomer comprising an alkenyl group having at least one pendent group comprising a functional group; providing dihydrosafrole as the template molecule; co-polymerizing the monomer and dihydrosafrole in the presence of a crosslinking agent, and an initiator to form a co-polymerized composition; substantially removing dihydrosafrole from the co-polymerized composition to form a molecularly imprinted co-polymer; providing a sample comprising a recognition molecule selected from the group consisting of safrole, dihydrosafrole, and isosafrole; and contacting the molecularly imprinted co-polymer with the sample to bind the recognition molecule to the molecularly imprinted co-polymer.

In another embodiment, a molecularly imprinted co-polymer prepared according to the above methods.

In yet another embodiment, a method of preparing a molecularly imprinted co-polymer is provided. The method comprises co-polymerizing at least one monomer in the presence of a crosslinking agent, an initiator, and dihydrosafrole as a template molecule to form a co-polymerized composition; and substantially removing dihydrosafrole from the co-polymerized composition to form the molecularly imprinted co-polymer.

DETAILED DESCRIPTION OF THE PREFERRED EMBODIMENTS

Figure 1:
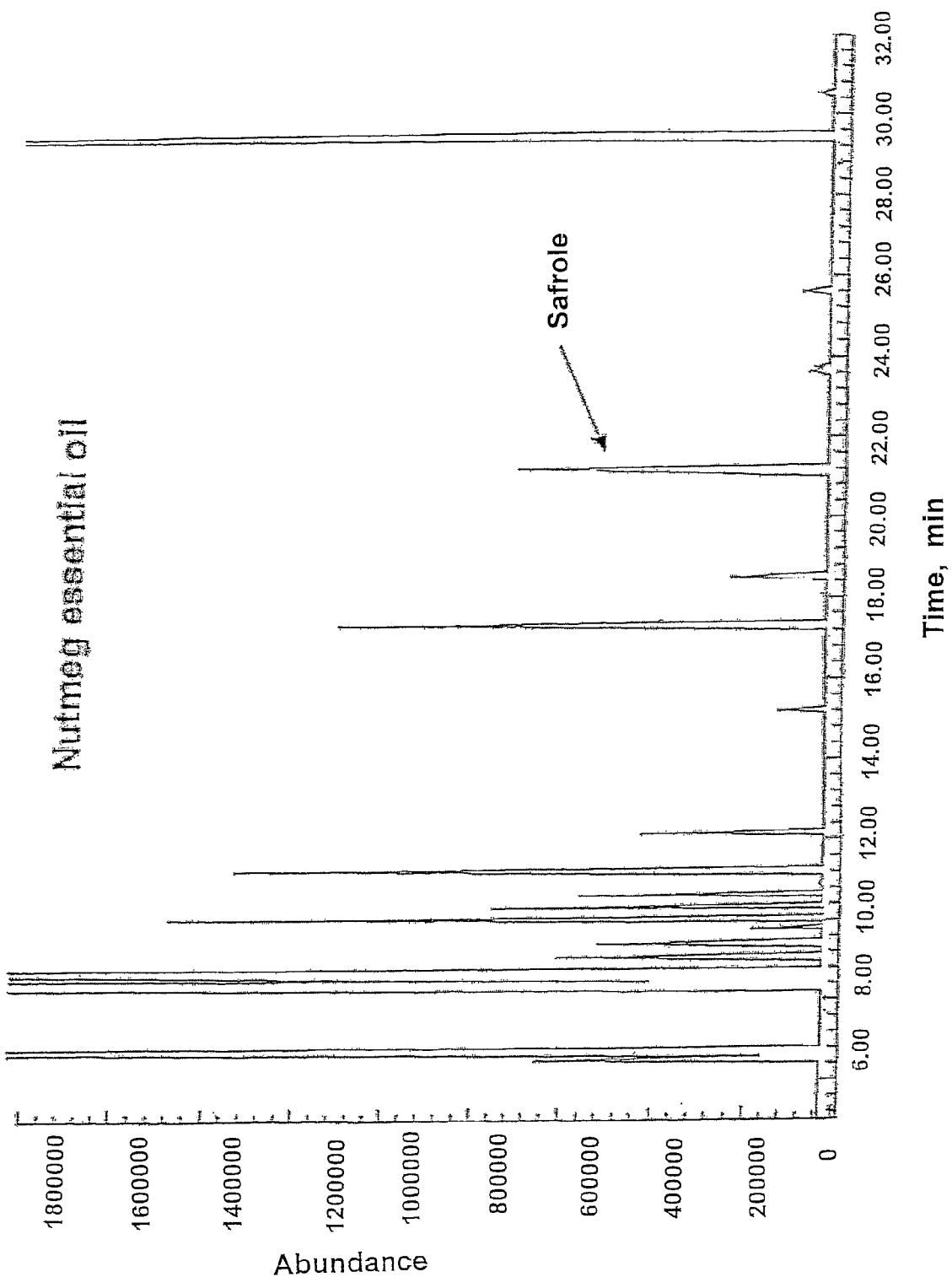
FIG. 1 is an illustrative chromatogram of safrole containing nutmeg essential oil prior to purification by the present method.

The molecularly imprinted polymers according to the invention comprise tailor-made recognition sites for a target, in which the recognition sites are located at or close to the surface of the polymer and/or of pores in the polymer. In one aspect of the invention, the recognition sites are specific binding sites for safrole. Using molecular imprinting techniques to remove safrole from nutmeg essential oil is useful because safrole can be removed selectively without altering the natural aroma and flavor of nutmeg essential.

Definitions

The term (meth)acrylic refers to methacrylic or acrylic or mixtures thereof.

The term (meth)acrylate refers to methacrylate or acrylate or mixtures thereof.

As used herein, the term acrylate refers to $H_2C=CHCO_2R$, wherein R is an alkyl, aryl, alkaryl or aralkyl group.

The term alkyl, as used herein, unless otherwise specified, refers to a saturated straight, branched, or cyclic, primary, secondary, or tertiary hydrocarbon of $C_1$ to $C_{10}$, and specifically includes methyl, ethyl, propyl, isopropyl, butyl, isobutyl, t-butyl, pentyl, cyclopentyl, isopentyl, neopentyl, hexyl, isohexyl, cyclohexyl, cyclohexylmethyl, 3-methylpentyl, 2,2-dimethylbutyl, and 2,3-dimethylbutyl. The alkyl group can be optionally substituted with any desired moiety, including but not limited to one or more moieties selected from the group consisting of hydroxyl, amino, alkylamino, arylamino, alkoxy, aryloxy, nitro, cyano, sulfonic acid, sulfate, phosphonic acid, phosphate, or phosphonate.

The term alkaryl or alkylaryl refers to an alkyl group with an aryl substituent.

The term aralkyl or arylalkyl refers to an aryl group with an alkyl substituent.

The term halo, as used herein, includes chloro, bromo, iodo, and fluoro.

The term alkenyl, as referred to herein, and unless otherwise specified, refers to a straight, branched, hydrocarbon of $C_2$ to $C_{10}$ with at least one double bond.

The term vinyl, as referred to herein, and unless otherwise specified, refers to a terminal double bond of the formula $H_2C=CH-$.

The term "purified" as used to describe a compound or composition refers to a compound or composition in which undesired compound(s) have been partially or completely removed. A purified compound or composition contains less of the undesired compound(s) than the unpurified compound or composition.

The term "recognition molecule" refers to a molecule which is recognized by and binds to a particular molecularly imprinted polymer. The recognition molecule may be the same as the target molecule for a given molecularly imprinted polymer, or the recognition molecule may be different from the template molecule. For example, a molecularly imprinted molecule made with dihydrosafrole as the template molecule will bind recognition molecules such as dihydrosafrole, safrole and isosafrole.

The term "template molecule" refers to any kind of entity capable of being used in the imprinting process for preparing the molecularly imprinted polymers according to the invention. A template molecule is a compound which is entrapped within a polymer during the polymerization process and forms an "imprint". The imprint contains many small crypts with shapes complimentary to the molecule of interest. The template molecule is preferably a purified template molecule. Preferably the template molecule comprises less than 20 wt % of impurities, also preferably less than 10 wt %, more preferably less than 5 wt %, even more preferably less than 1 wt % of impurities.

The term "essential oil" refers to a concentrated, hydrophobic liquid containing volatile aromatic compounds extracted from plants. An essential oil is a volatile oil, having the characteristic odor or flavor of the plant from which it is obtained. It may be produced by distillation, expression, or solvent extraction. The term essential is intended to convey that the oil is an essence of the plant it is extracted from.

The term "nutmeg oil" refers to a volatile oil obtained from nutmegs. The essential oil is obtained by the steam distillation of ground nutmeg. The oil is colorless or light yellow and smells and tastes of nutmeg.

Molecularly Imprinted Polymers

In a first embodiment of the present invention, methods are provided which employ molecularly imprinted polymers. Molecular imprinting is a technique for the preparation of synthetic polymers containing recognition sites for certain target molecules. This is achieved by co-polymerizing functional monomers and crosslinking monomers in the presence of the target molecule, which acts as a molecular template. The functional monomers arrange specifically around the molecular template, and are subsequently held in position by polymerization with a usually high degree of crosslinking. After polymerization, the molecular template is extracted from the polymer, revealing complementary binding sites that allow rebinding of the target molecule with in many cases very high specificity, comparable to that of antibodies. Using molecular imprinting techniques to remove safrole from nutmeg essential oil is useful because safrole can be removed selectively without altering the natural aroma and flavor of nutmeg essential oil.

Template Molecule

Molecularly imprinted polymers are formed by the polymerization of monomers in the presence of crosslinking agents and in the presence of template molecules. Template molecules are compounds which are entrapped within a polymer during the molecularly imprinting polymerization process and form an "imprint". The imprint contains many small crypts with shapes complimentary to the template molecule. There are two distinct molecular imprinting approaches, namely non-covalent and covalent imprinting. Covalent imprinting protocols are based on covalent interactions between template molecules and monomers and or crosslinking agents. After polymer formation the template molecules are removed by chemical cleavage, leaving behind a specific binding site. Rebinding of the target molecule or a recognition to the molecularly imprinted polymer is based on reversible covalent bonds or non-covalent interactions. A recognition molecule is a molecule which is binds to a particular molecularly imprinted polymer. Non-covalent molecular imprinting relies on non-covalent interactions, such as hydrogen bonds, ionic bonds, pi-pi stacking or hydrophobic interactions, between the template molecule and monomers and or crosslinking agents. After polymer formation, the template molecule is removed from the molecularly imprinted polymer by solvent extraction. Rebinding of the target molecule or recognition molecule is via non-covalent interactions. The present invention is directed at non-covalent molecular imprinting.

In one embodiment of the present invention, molecularly imprinted co-polymers which bind safrole are provided. Accordingly, a template molecule is provided to prepare such a molecularly imprinted polymer. Safrole (I) which is an aromatic compound containing an allylic side chain, is not suitable as a template molecule due to the allylic side chain which can take place in the polymerization process, forming an irreversible covalent bond. Isosafrole (II) which is a geometric isomer of safrole is also unsuitable as a template molecule for similar reasons. Another compound which is related to safrole is dihydrosafrole (III) which has a saturated side chain. Dihydrosafrole is a suitable template molecule for non-covalent molecular imprinting because it will not enter into the polymerization reaction. The molecularly imprinted polymer formed using dihydrosafrole will bind dihydrosafrole. Because the chemical and physical properties of dihydrosafrole, isosafrole, and safrole are similar, the same molecularly imprinted polymer will also recognize and bind safrole and isosafrole. As such, dihydrosafrole is a suitable template molecule to form a molecularly imprinted polymer which will recognize safrole.

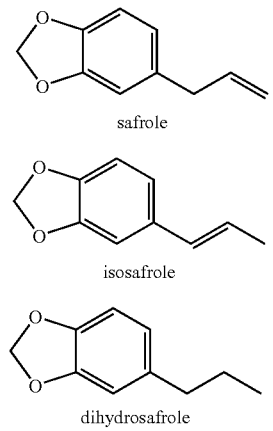

Monomers

The molecularly imprinted co-polymers according to the invention are obtainable by polymerizing monomers in the presence of a template molecule. Alkenyl, for example vinyl, monomers with pendant side chains containing functional groups are suitable are particularly suitable for the present invention. A pendant side chain may be an aliphatic side chain containing from 0 to 6 carbon atoms. The pendant side chain comprises a functional group attached to the aliphatic group. The functional group may be attached at any suitable position on the aliphatic group. Examples of functional groups include but are not limited to amido, carboxylic acid, sulfonic acid, and phosphonic acid.

The double bond of the alkenyl monomer may be substituted with only the pendent side chain, for example $H_2C=CH$-(pendent side chain). These monomers are referred to herein as vinyl monomers. In other aspects, the double bond of the monomer may be disubstituted. The additional substituent may be any suitable substituent, but preferably is a $C_{1-6}$ alkyl substituent, and more preferably a methyl substituent. The substituent may be attached to the same carbon of the double bond to which the pendent side chain is attached. In this case, the alkenyl monomer is referred to as α-substituted. In other aspects, the substituent may be attached to the adjacent carbon of the double bond to which the pendent side chain is attached. In this case, the alkenyl monomer is referred to as β-substituted. Alkenyl monomers which are β-substituted can have a cis or trans configuration. In other aspects that alkenyl monomer can have three or four substituents including the pendent side chain.

Examples of alkenyl monomers having a pendant chain comprising an amido functional group include, but are not limited to acrylamides, N,N-dimethylacrylamide, N-(hydroxymethyl)acrylamide, N-isopropylacrylamide, N-(tert-butyl)acrylamide, 4-acryloylmorpholine, N-phenylacrylamide; α-substituted acrylamides including, for example, methacrylamides, N-(hydroxymethyl)-2-methylacrylamide, and N-isopropyl-2-methylacrylamide; β-substituted acrylamides including for example, crotonamides, 2-butenamide, 2-butenediamide, 4-amino-4-oxo-2-butenoic acid, 4-(methylamino)-4-oxo-2-butenoic acid, 2,5-dimethyl-2,4-hexadienamide, 4-(ethylamino)-4-oxo-2-butenoic acid, 2-butenedihydrazide, and 3-phenyl-2-propenamide; and α,β-substituted acrylamides. It is to be understood that the amido nitrogen of theses monomers may be substituted or unsubstituted. For example, N-alkyl-substituted and N,N-dialkyl-substituted amido functional groups are within the scope of the present invention.

Examples of alkenyl monomers having a pendent chain comprising a carboxylic acid functional group include but are not limited to acrylic acids; α-substituted acrylic acids including, for example, methacrylic acid, 2-methylacrylic acid, 2-methyl-2-butenoic acid, and 2-amino-3-butenoic acid; β-substituted acrylic acids including for example crotonic acids, 2,4-pentadienoic acid, 3-methyl-2-butenoic acid, 2-pentenoic acid, 3-chloro-2-propenoic acid, 1-cyclopentene-1-carboxylic acid, 2,4-hexadienoic acid, 4-methyl-2-pentenoic acid, 2-hexenoic acid, 4-amino-4-oxo-2-butenoic, 2-butenedioic acid, 1-cyclohexene-1-carboxylic acid, 2,6-heptadienoic acid, cyclopentylideneacetic acid, and 3-methyl-4-oxo-2-pentenoic; and α,β-substituted acrylic acids including for example 2-methyl-2-pentenoic acid and 2-cyano-3-methyl-2-butenoic acid.

Examples of alkenyl monomers having a pendent chain comprising an sulfonic acid functional group include acrylsulfonic acids; methacrylsulfonic acid and other α-substituted acrylsulfonic acids; and crotonsulfonic acids and other β-substituted acrylsulfonic acids.

Examples of alkenyl monomers having a pendent chain comprising a phosphonic functional group include acrylphosphonic acids; methacrylphosphonic acid and other α-substituted acrylphosphonic acids; and crotonphosphonic acids and other β-substituted acrylphosphonic acids.

Crosslinking Agents

The molecularly imprinted co-polymers according to the invention are obtainable by polymerizing monomers in the presence of crosslinking agents. Crosslinking agents are monomers that, during the polymerization process, form covalent bonds linking one polymer chain to another. Crosslinking agents are known to those skilled in the art, and include di-, tri- and tetrafunctional acrylates or methacrylates, divinylbenzene (DVB), alkylene glycol and polyalkylene glycol diacrylates and methacrylates, including ethylene glycol dimethacrylate (EGDMA) and ethylene glycol diacrylate, vinyl or allyl acrylates or methacrylates, divinylbenzene, diallyldiglycol dicarbonate, diallyl maleate, diallyl fumarate, diallyl itaconate, vinyl esters such as divinyl oxalate, divinyl malonate, diallyl succinate, triallyl isocyanurate, the dimethacrylates or diacrylates of bis-phenol A or ethoxylated bis-phenol A, methylene or polymethylene bisacrylamide or bismethacrylamide, including hexamethylene bisacrylamide or hexamethylene bismethacrylamide, di(alkene) tertiary amines, trimethylol propane triacrylate, pentaerythritol tetraacrylate, divinyl ether, divinyl sulfone, diallyl phthalate, triallyl melamine, 2-isocyanatoethyl methacrylate, 2-isocyanatoethylacrylate, 3-isocyanatopropylacrylate, 1-methyl-2-isocyanatoethyl methacrylate, 1,1-dimethyl-2-isocyanaotoethyl acrylate, tetraethylene glycol diacrylate, tetraethylene glycol dimethacrylate, triethylene glycol diacrylate, triethylene glycol dimethacrylate, hexanediol dimethacrylate, and hexanediol diacrylate. Preferably the crosslinking agent is ethylenebisacrylamide. More preferably the crosslinking agent is ethylene glycol dimethacrylate.

Any ratio of monomer to crosslinking agent to template molecule can be used that provides a polymer of the appropriate integrity and which binds safrole or the desired compound. Preferably about 1 to about 5 parts by weight of monomer, about 3 to about 10 parts by weight of crosslinking agent, and about 0.2 to about 3 parts by weight of template molecule are used. More preferably, about 1 to about 3 parts of monomer, about 5 to about 9 parts of crosslinking agent, and about 0.2 to about 2 parts of template molecule are used. Even more preferably, about 2 parts of monomer, about 7 parts of crosslinking agent and about 1 part of template molecule are used.

An initiator may be used to initiate the polymerization of monomers and crosslinking agents in the method may be initiated an initiator. Initiators include thermal initiators, UV light, gamma radiation, visible light or chemical means. Examples of UV light initiators and thermal initiators include benzoyl peroxide, acetyl peroxide, lauryl peroxide, 2,2-azobis(isobutyronitrile), t-butyl peracetate, cumyl peroxide, t-butyl peroxide, t-butyl hydroperoxide, bis(isopropyl)peroxy-dicarbonate, benzoin methyl ether, 2,2'-azobis(2,4-dimethylvaleronitrile), tertiarybutyl peroctoate, phthalic peroxide, diethoxyacetophenone, and tertiarybutyl peroxypivalate, diethoxyacetophenone, 1-hydroxycyclohexyl phenyl ketone, 2,2-dimethyoxy-2-phenyl-acetophenone, and phenothiazine, and diisopropylxanthogen disulfide. Preferably the initiator is 2,2-azobis(isobutyronitrile). The amount of initiator is preferably less than about 3% by weight of the weight of monomer plus crosslinking agent, more preferably less than about 2% by weight, even more preferably less than 1% by weight.

While free radical polymerization is preferred, monomers can also be selected that are polymerized cationically or anionically. Polymerization conditions should be selected that do not adversely affect the template molecule. The monomers used in the polymerization process can either have the same or different functionalities.

Methods of Forming Molecularly Imprinted Polymers

In one embodiment of the present invention, methods of forming molecularly imprinted co-polymers are provided. The polymerization of the monomer in the presence of the crosslinking agent and the template molecule may occur at any suitable concentration. The polymerization be performed "neat", i.e. no solvent is used. Preferably the polymerization is performed in a reaction solvent.

The reaction solvent is either aqueous or non-aqueous, and is either composed of a single solvent component or multiple solvent components. The reaction solvent is preferably comprises an alcohol, with ethanol being preferred. Preferably the reaction solvent comprises at least about 80% ethanol by weight, more preferably at least about 90% ethanol by weight.

Any suitable concentration of may be used during the polymerization process. Herein, the concentration refers to the weight percent of monomer plus crosslinking agent in relation to the total weight of monomer plus crosslinking agent plus solvent. Preferably the concentration is between about 30 to about 70% by weight, more preferably about 40 to about 60% by weight, even more preferably about 45 to about 55% by weight.

The reaction may be performed in a reduced oxygen environment. For example, the reaction mixture may be degassed by repeated freeze-pump-thaw cycles. In a freeze-pump-thaw cycle, the reaction mixture is frozen, the head spaced is evacuated to remove oxygen, then refilled with an inert gas such as nitrogen. The reaction mixture is then thawed, to allow the head space gasses to equilibrate with the gasses dissolved in the reaction mixture. The freeze-pump-thaw cycle is repeated to a desired number of cycles or a desired oxygen level. Other methods of reducing oxygen levels in the reaction mixture which known to one skilled in the art may also be employed. For example at larger scale, the reaction mixture or solvent may be chilled, then the head space gasses removed via vacuum, and then refilled with an inert gas such as nitrogen. This cycle may be repeated until a suitable oxygen level is attained. Alternatively, the reaction mixture or solvent may be purged with an inert gas to displace dissolved oxygen in solution.

The polymerization is preferably performed at a temperature. The temperature is preferably between about 50 and about 70° C., more preferably about between about 55 and about 65° C. The polymerization reaction is carried out at the specified temperature for a specified time. Preferably, the time is about 1 to about 10 hours, more preferably about 2 to about 6 hours, even more preferably about 2 to about 4 hours.

After the polymerization is complete, the co-polymerized composition is separated from the reaction solvent and the target molecule is removed from the co-polymerized composition. The amount of target molecule removed from the co-polymerized composition affects the loading characteristics of the molecularly imprinted polymer. The more target molecule that is removed, the more efficient the resulting molecularly imprinted co-polymer is at purifying a sample. Preferably, the target molecule is substantially removed from the co-polymerized composition. As used herein, substantially removing the target molecule from the co-polymerized composition means that the co-polymerized composition contains less than 10% by weight of the initial amount of target molecule used the polymerization process, preferably less than 5% by weight, even more preferably less than 1% by weight.

One method for removing the target molecule from the co-polymerized composition involves crushing the co-polymerized composition and optionally sieving the crushed co-polymerized composition to provide a co-polymerized composition with a desired particle size. The particle size may be between about 1 μm to about 1 mm. Preferably the particle size is between about 1 to about 200 μm, more preferably between about 45 to about 100 μm.

The crushed co-polymerized composition is treated with a purifying solvent to remove the target molecule and form the molecularly imprinted co-polymer. Any suitable purifying solvent may be used which dissolves the target molecule. Preferably the purifying solvent dissolves the target molecule, with minimal dissolution of the molecularly imprinted co-polymer. When dihydrosafrole in used as the target molecule, the purifying solvent preferably comprises an alcohol, with ethanol being preferred. Preferably the purifying solvent comprises at least about 80% ethanol by weight, more preferably at least about 90% ethanol by weight.

The crushed co-polymerized composition is mixed with the purifying solvent. Preferably about 8 to about 15 parts by weight of solvent are used to about 2 to about 6 parts by weight of template molecule contained by the co-polymerized composition. More preferably about 8 to 10 parts of solvent are used to about 3 to about 5 parts of template molecule contained by the co-polymerized composition. Even more preferably about 10 parts of solvent are used to about 4 parts of template molecule contained by the co-polymerized composition.

The mixing takes place over a period of time. A suitable time is determined by the time it takes the template molecule to dissolve. Preferably the time is between about 2 and about 24 hours, more preferably between about 6 and about 18 hours, even more preferably between about 10 and about 14 hours. The mixing takes place between about 15 and about 35° C., preferably between about 20 and about 30° C., even more preferably at about room temperature.

After mixing the molecularly imprinted co-polymer with the purifying solvent, the polymer is separated from the purifying solvent, and optionally washed with fresh solvent which is free of the template molecule. The resulting molecularly imprinted co-polymer is dried to remove residual solvent. Preferably the polymer is dried between about 40 and about 80° C., more preferably between about 50 and about 70° C., even more preferably between about 55 and about 65° C.

Methods of Purification

In one embodiment of the present invention, a method of purifying a sample containing at least one recognition molecule selected from the group consisting of safrole, isosafrole, and dihydrosafrole is provided. The method provides contacting a molecularly imprinted co-polymer prepared according to above procedure with a sample containing a recognition molecule. A recognition molecule refers to a molecule which is recognized by and binds to a particular molecularly imprinted co-polymer. For example, a molecularly imprinted polymer prepared using dihydrosafrole as the target molecule, binds suitable recognition molecules including safrole, dihydrosafrole, and isosafrole. Preferably the recognition molecule is safrole.

The sample containing the recognition molecule is contacted with the molecularly imprinted co-polymer. The sample can be used "neat" or it can be diluted with a solvent, if desired. Suitable solvents are any solvent which dissolves the sample, but does not dissolve or minimally dissolves the molecularly imprinted co-polymer. The sample may be agitated with the molecularly imprinted co-polymer over a period of time. Preferably the sample is agitated with the molecularly imprinted co-polymer for at least 1 hour. The amount of molecularly imprinted co-polymer in relation to the amount of sample, depends on the amount of recognition molecule contained by the sample and the loading capacity of the molecularly imprinted co-polymer. When the sample is nutmeg essential oil, the ratio of sample to molecularly imprinted co-polymer is about 6 to about 20 parts by weight of sample to about 1 to about 5 parts by weight of molecularly imprinted co-polymer. More preferably, about 8 to about 15 parts of sample to about 2 to about 4 parts of molecularly imprinted co-polymer are used. Even more preferably, about 10 parts of sample to about 3 parts of molecularly imprinted co-polymer.

Alternatively the amount of molecularly imprinted co-polymer to be used can be determined by the amount of recognition molecule in the sample. Preferably about 50 to about 300 parts by weight of molecularly imprinted co-polymer are used to about 2 to about 6 parts by weight of recognition molecule contained by the sample. More preferably about 80 to 150 parts of molecularly imprinted co-polymer are used to about 3 to about 5 parts of recognition molecule contained by the sample. Even more preferably about 100 parts of molecularly imprinted co-polymer about 4 parts of recognition molecule contained by the sample.

The sample is then separated from the molecularly imprinted co-polymer to provide the purified sample which is substantially free of the recognition molecule. By substantially free, it is meant that more than about 80% by weight of the recognition molecule is removed from the sample, preferably more than about 90%, more preferably more than about 95%, even more preferably more than about 97%, still more preferably more than about 99%, and most preferably more than about 99.9%.

In one preferred embodiment, the purified sample is nutmeg essential oil, and the recognition molecule is safrole. The substantially safrole free nutmeg essential oil prepared by this method, preferably has more than about 80% by weight of the safrole removed from the unpurified nutmeg oil sample, more preferably more than about 90%, also more preferably more than about 95%, even more preferably more than about 97%, also even more preferably more than about 97%.

Nutmeg oil typically contains between about 0.2-3% safrole by weight. In some embodiments, the substantially safrole free nutmeg essential oil prepared by this method contains less than 0.1% by weight safrole, more preferably less than 0.01%, even more preferably less than 0.001% by weight safrole.

Other methods known to one skilled in the art may be employed for contacting the sample containing the recognition molecule with the molecularly imprinted co-polymer. For example, the molecularly imprinted co-polymer may be used as a chromatographic stationary phase either alone or in combination with one or more other chromatographic stationary phases. In this example, the sample, either in "neat" form or diluted with a solvent, is passed through the molecularly imprinted co-polymer. For example, the molecularly imprinted co-polymer may be packed in a cylinder, and the sampled passed from one end of the cylinder to the other via pressure, gravity or suction, such that the recognition molecule is retained by the molecularly imprinted co-polymer which remains stationary in the cylinder, wherein the purified sample exits the cylinder. This type of chromatographic purification may be done either in batch mode or a continuous manner.

The molecularly imprinted co-polymer may retain some of the purified sample, or otherwise be saturated with the sample, and it may be desirable to isolate this portion of the purified sample from the molecularly imprinted co-polymer. This may be done by any method known to one skilled in the art. For example, the molecularly imprinted co-polymer which remains after separation from the sample, may be heated and treated with a inert gas such as nitrogen over a period of time. The molecularly imprinted co-polymer may be heated to between about 60 to about 100° C., preferably between about 70 to about 90° C., more preferably between about 75 to about 85° C. The inert gas is passed over the molecularly imprinted co-polymer in a continuous manner, causing the sample to volatilize, and then passes through activated carbon where the sample is absorbed. After a desired time, the activated carbon is collected and extracted with a suitable solvent, for example, diethyl ether, to remove the purified sample from the activated carbon. The extracts are then combined and concentrated to afford an additional fraction of purified material.

Methods of purification may optionally include reclaiming or regenerating the molecularly imprinted-copolymer. For example, after the molecularly imprinted co-polymer has bound the recognition molecule, the molecularly imprinted co-polymer may be washed with a suitable washing solvent to remove the recognition molecules from the binding sites. A suitable washing solvent preferably comprises an alcohol, with ethanol being preferred. Preferably the washing solvent comprises at least about 80% ethanol by weight, more preferably at least about 90% ethanol by weight. The weight of wash solvent is at least 3 times that of the molecularly imprinted co-polymer, more preferably at least 4 times. The molecularly imprinted co-polymer is agitated or otherwise contacted with the wash solvent, then separated from the solvent and dried.

EXAMPLES

Nutmeg essential oil was purchased from Chimmed (Russia, Moscow). Safrole, dihydrosafrole, 2,2-azobis(isobutyronitrile) were obtained from Merck. Ethylene glycol dimethacrylate was obtained from Aldrich.

Analysis of nutmeg oil was done using a TRACE GC 2000 Gas Chromatograph (Thermo Finnigan) with Polaris Q mass selective detector (Thermo Finnigan) and an autosampler. The column used was a TRACE TR-WAX (Them10 Finnigan) column 30 m×0.25 μm×0.25 μm film thickness. Initial temperature was set to 50° C., and the temperature was ramped to 240° C. at 4° C. per minute. 1 μL of sample was injected onto the column using a 10:1 split ratio with split flow of 9.8 mL/min. The injection port temperature was set to 250° C. The solvent delay was 3 minutes.

As shown in FIG. 1, the GC analysis determined that the concentration of safrole in essential nutmeg oil was up to 1.2 wt %. The density of essential nutmeg oil was 0.920 g/L.

Preparation of Molecular Imprinted Polymer

A mixture of dihydrosafrole, acrylamide and ethylene glycol dimethacrylate was prepared comprising 10% by weight of dihydrosafrole, 20% by weight acrylamide, and 70% by weight ethylene glycol dimethacrylate. The resulting mixture was diluted with 90% ethanol such that the weight of ethanol was equal to the weight of acrylamide plus ethylene glycol dimethacrylate. The resulting solution was degassed by repeated freeze-pump-thaw cycles. To initiate the polymerization 2,2-azobis(isobutyronitrile) was added (1 wt % of total weight of acrylamide plus ethylene glycol dimethacrylate). The mixture was heated 60° C. for 3 hours, and purged continuously with a stream of nitrogen during the polymerization. The resulting cross-linked macroporous co-polymer was ground and sieved. The fraction with particle size 45-100 μm was collected. These particles were treated with 90% ethanol in a shaker at room temperature for 12 h. During this process about 99% of dihydrasafrole was released from the polymer. The molecular imprinted polymer was dried at 60° C.

Removal of Safrole from Nutmeg Oil

Nutmeg oil and molecular imprinted co-polymer prepared above (10:3 weight ratio of nutmeg oil to polymer) were incubated for 1 hour at room temperature with agitation. The mixture was then centrifuged and nutmeg oil decanted from the polymer to provide a first fraction of purified nutmeg oil in about 70% yield.

Figure 2:
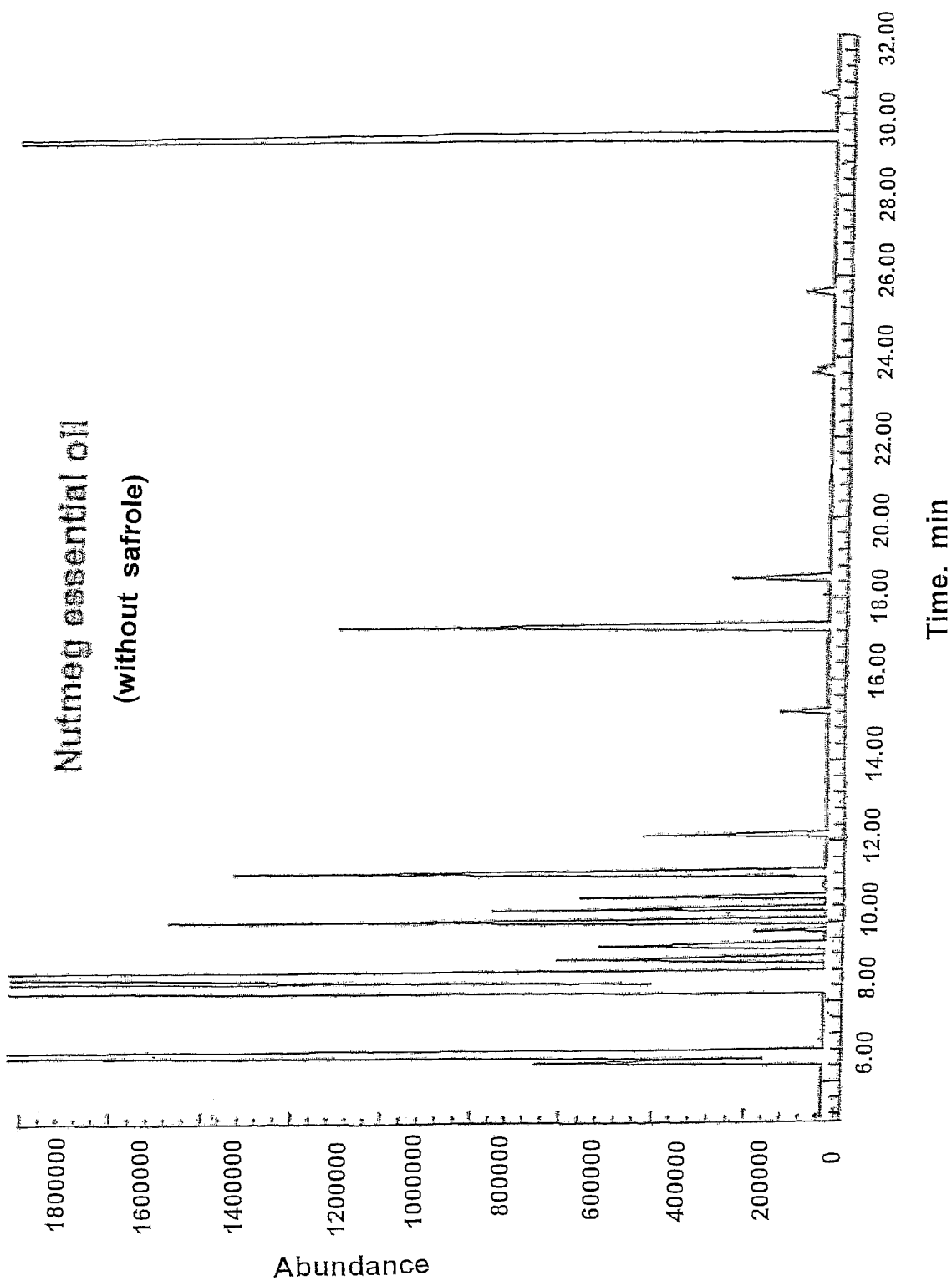
FIG. 2 is an illustrative chromatogram of nutmeg essential oil after purification by the present method.

The imprinted co-polymer adsorbed about 1.1 mL of nutmeg oil per gram of imprinted co-polymer. To recover the absorbed nutmeg oil, the polymer was heated at 80° C. with a stream of nitrogen for 2 hours. During this process the stream of nitrogen was saturated with nutmeg oil vapors and then passed through activated carbon. After this stage the nutmeg oil was extracted from activated carbon with diethyl ether. The resulting solution was concentrated by distillation to remove diethyl ether to provide a second fraction of purified nutmeg oil. Analysis by the GC method provided, indicated that the two fractions of purified nutmeg oil were not practically different and contained virtually no safrole compared to the starting nutmeg essential oil sample. The first and second fractions were combined to afford purified nutmeg oil in about 90-95% yield. A GC trace of the combined first and second fractions is shown in FIG. 2.

Reclaiming of the Molecular Imprinted Polymer

The molecular imprinted co-polymer containing safrole was washed with 90% ethanol in a shaker at room temperature for 12 h. At least a 1:3 weight ratio of printed safrole to solvent was used, where the concentration of safrole in the imprinted co-polymer was taken to be equal to the concentration of dihydrosafrole used to synthesize the imprinted polymer. The polymer was separated from the solution, and the polymer was dried at 60° C.

Determination of Imprinted Polymer Loading

The amount of molecularly imprinted copolymer required to remove a given amount of safrole was determined by a safrole binding study according to the method described in Morissette, P., Beaulieu, M., and Vinet, B. *Clinical Chemistry* 2000, 46, 1516-1518. Binding of safrole was determined for series of assays with 100 mL nutmeg oil and varying amounts of the molecularly imprinted co-polymer made according to the methods described above (80, 75, 50, 25, 10, 5 and 1 g of imprinted co-polymer). The total capacity of the molecularly imprinted co-polymer was determined to be about 40 mg safrole/g polymer (i.e. 247 μmol/g). For typical concentrations of safrole found in nutmeg essential oil, approximately 30 wt % of imprinted polymer can be used per mass of nutmeg essential oil. For example, 30 g of molecularly imprinted co-polymer was added for removal of safrole from 100 g (109 mL) nutmeg oil.

As one of ordinary skill in the art may appreciate from the teachings herein, the present invention may be applicable to other compositions and processes. For example, the molecularly imprinted co-polymer may be used for removing safrole, dihydrosafrole or isosafrole from other compositions such as sassafras, camphor oil, and juniper volatile leaf oil. Compositions that are made substantially safrole free according to the processes presented herein may be useful as fragrance or flavor ingredients in food, cosmetics, herbal products, and other products. For example, substantially safrole free nutmeg oil may be useful as a flavoring agent for tobacco used for making chewing tobacco or smoking articles, such as cigarettes.

It is therefore intended that the foregoing detailed description be regarded as illustrative rather than limiting, and that it be understood that it is the following claims, including all equivalents, that are intended to define the spirit and scope of this invention.

What is claimed is:

1. A method of preparing substantially safrole free nutmeg essential oil comprising the steps of:
   providing at least one monomer, wherein the monomer is acrylamide;
   providing a template molecule, wherein the template molecule is purified dihydrosafrole;
   co-polymerizing the at least one monomer in the presence of a crosslinking agent and in the presence of the template molecule to form a co-polymerized composition;
   substantially removing dihydrosafrole from the co-polymerized composition to form a molecularly imprinted co-polymer;
   providing nutmeg essential oil comprising safrole; and
   contacting the molecularly imprinted co-polymer with the nutmeg essential oil comprising safrole to bind the safrole to the molecularly imprinted co-polymer and form substantially safrole free nutmeg essential oil.

2. The method of claim 1 further comprising the steps of:
   separating the substantially safrole free nutmeg essential oil from the molecularly imprinted co-polymer.

3. The method of claim 2, wherein the co-polymerizing is done the presence of an initiator, wherein the initiator is 2,2-azobis(isobutyronitrile); and
   wherein the crosslinking agent is ethylene glycol dimethacrylate.

4. The method of claim 3, wherein substantially removing dihydrosafrole from the co-polymerized composition comprises:
   crushing the co-polymerized composition to form a crushed co-polymerized composition;
   contacting the crushed co-polymerized composition with a first solvent; and
   separating the solvent from the crushed co-polymerized composition to form the molecularly imprinted co-polymer.

5. The method of claim 4, wherein the first solvent comprises about at least 90% by weight ethanol.

6. A method for removing safrole, dihydrosafrole, or isosafrole from a sample, comprising the steps of:
- providing at least one monomer comprising an alkenyl group having at least one pendent group comprising a functional group selected from the group consisting of an amide, a carboxylic acid, a sulfonic acid, and a phosphonic acid;
- providing a template molecule, wherein the template molecule is purified dihydrosafrole;
- co-polymerizing the at least one monomer in the presence of a crosslinking agent, an initiator, and the template molecule to form a co-polymerized composition;
- substantially removing dihydrosafrole from the co-polymerized composition to form a molecularly imprinted co-polymer;
- providing a sample comprising a recognition molecule selected from the group consisting of safrole, dihydrosafrole, and isosafrole; and
- contacting the molecularly imprinted co-polymer with the sample to bind the recognition molecule to the molecularly imprinted co-polymer.

7. The method of claim 6, wherein the at least one monomer comprises an alkenyl group having a pendent group comprising an amide functional group.

8. The method of claim 7, wherein substantially removing dihydrosafrole from the co-polymerized composition comprises:
- crushing the co-polymerized composition to form a crushed co-polymerized composition;
- contacting the crushed co-polymerized composition with a first solvent; and
- separating the solvent from the crushed co-polymerized composition to form the molecularly imprinted co-polymer.

9. The method of claim 8, wherein the monomer is acrylamide, the crosslinking agent is ethylene glycol dimethacrylate, and the initiator is 2,2-azobis(isobutyronitrile).

10. A molecularly imprinted co-polymer prepared by the steps of:
- co-polymerizing at least one monomer in the presence of a crosslinking agent, an initiator, and a template molecule to form a co-polymerized composition;
  - the template molecule comprising purified dihydrosafrole, and the at least one monomer comprising an alkenyl group having at least one pendent group comprising a functional group selected from the group consisting of an amide, a carboxylic acid, a sulfonic acid, and a phosphonic acid; and
- substantially removing dihydrosafrole from the co-polymerized composition to form the molecularly imprinted co-polymer.

11. The molecularly imprinted co-polymer according to claim 10, wherein the monomer is acrylamide, the crosslinking agent is ethylene glycol dimethacrylate, and the initiator is 2,2-azobis(isobutyronitrile).

12. The molecularly imprinted co-polymer according to claim 11, wherein substantially removing dihydrosafrole comprises:
- crushing the co-polymerized composition to form a crushed co-polymerized composition;
- contacting the crushed co-polymerized composition with a solvent, wherein the solvent comprises at least about 90% ethanol; and
- separating the solvent from the crushed co-polymerized composition.

13. A method of preparing a molecularly imprinted co-polymer comprising:
- co-polymerizing at least one monomer in the presence of a crosslinking agent, an initiator, and a template molecule to form a co-polymerized composition;
  - wherein the template molecule is purified dihydrosafrole;
- wherein the at least one monomer comprises an alkenyl group having at least one pendent group comprising a functional group selected from the group consisting of an amide, a carboxylic acid, a sulfonic acid, and a phosphonic acid; and
- substantially removing dihydrosafrole from the co-polymerized composition to form the molecularly imprinted co-polymer.

14. The method of claim 13, wherein the monomer comprises an alkenyl group having at least one pendent group comprising an amido functional group.

15. The method of claim 14, wherein the monomer is acrylamide.

16. The method of claim 15, wherein the crosslinking agent is ethylene glycol dimethacrylate.

17. The method of claim 16, wherein the initiator is 2,2-azobis(isobutyronitrile).

18. The method of claim 17, wherein the co-polymerizing is performed between about 50 and 70° C.; and
- wherein the co-polymerizing is performed in a solvent, wherein the solvent comprises at least about 90% ethanol.

19. The method of claim 18, wherein substantially removing dihydrosafrole comprises:
- crushing the co-polymerized composition to form a crushed co-polymerized composition;
- contacting the crushed co-polymerized composition with a solvent, wherein the solvent comprises at least about 90% ethanol; and
- separating the solvent from the crushed co-polymerized composition to form the molecularly imprinted co-polymer.

20. The method of claim 19, further comprising drying the molecularly imprinted co-polymer at between about 50 and about 70° C.

* * * * *